H. BARTHEL.
BALL BEARING.
APPLICATION FILED JULY 11, 1910.
990,204.
Patented Apr. 18, 1911.
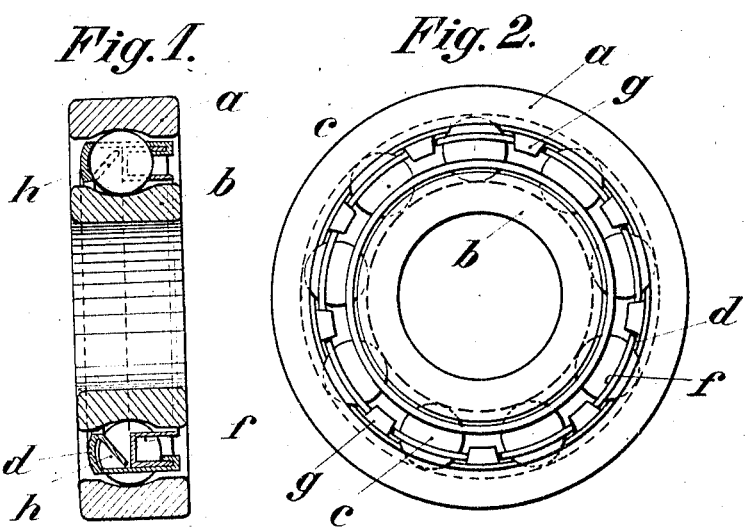
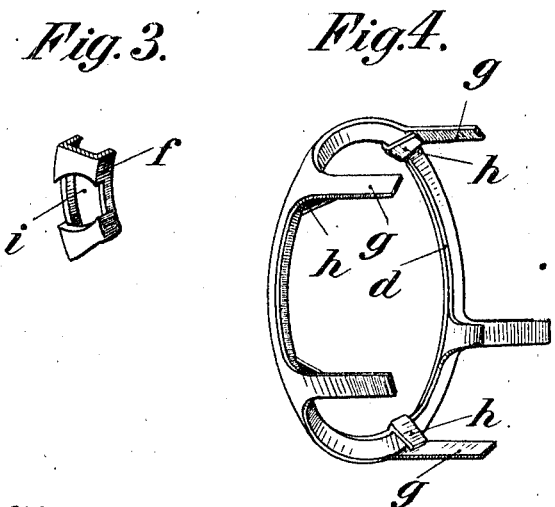
Witnesses:
E. J. Williams
Chev. L. Griestauer
Inventor:
Hermann Barthel
by Everett Dufour, atty

UNITED STATES PATENT OFFICE.

HERMANN BARTHEL, OF SCHWEINFURT, GERMANY.

BALL-BEARING.

990,204.
Specification of Letters Patent. Patented Apr. 18, 1911.
Application filed July 11, 1910. Serial No. 571,452.

*To all whom it may concern:*

Be it known that I, HERMANN BARTHEL, a subject of the King of Prussia, residing at No. 7 Petersgasse, Schweinfurt, Germany, have invented new and useful Improvements in Ball-Bearings, of which the following is a specification.

My invention relates to ball-bearings, and a primary object is to provide therefor an improved ball-cage consisting of two rings, of which the one embraces the other by means of clamp-like tongues or lugs.

Guide cages consisting of half rings and held together by rivets, screws or clamps are well-known in themselves, and my invention relates particularly to the special construction of such rings, whereby various important advantages are obtained.

One illustrative embodiment of my invention is represented by way of example in the accompanying drawing, wherein:—

Figure 1 is a vertical section, and Fig. 2 a side elevation of a bearing comprising my improved cage; Fig. 3 is a perspective view showing part of one of the rings forming the cage, and Fig. 4 is a like view showing the other ring before the two rings have been secured together.

Referring to the drawing, the one part of my cage consists of a ring $f$ having a U-shaped section, preferably pressed out of sheet metal, and having apertures $i$ for receiving and separating the balls $c$. The bottom of ring $f$ is preferably located in the central plane of the bearing. I stamp the second part $g$ of the cage out of sheet metal approximately in the shape shown in Fig. 4 and then press it to form a ring represented in section in Fig. 1. The lugs $h$ are bent inwardly, whereas the lugs $g$ are bent over the side of ring $f$, so that the two parts $f$, $d$ form a cage. Particularly in the case of bearings having groove-shaped ball-races the lugs $g$ may be bent, as described, after the balls $c$ have been inserted in the bearing.

Some of the advantages of my improved cage are as follows:—It can be made cheaply out of sheet metal on a large scale and has a small weight; the bottom of the one ring $f$ is located in the central plane through the balls, in which the cage is loaded by the balls when the bearing is subjected to great stresses, and the pressure of the balls is consequently taken up by the full section of this bottom, whereby great durability of the same is obtained in spite of the small weight of the cage; the cage consists of only two parts without additional rivets, screws, clamps and the like; it can readily be assembled after the bearing has been filled with balls; the lugs $g$ engage over the ring $f$ at the part of the cage at a greatest radial distance from the center of the bearing, so that these lugs can be made broad and the spaces between the balls nevertheless small, whereby, on the one hand, greater durability of the lugs $g$ or of the cage is possible, and, on the other hand, it is possible to accommodate such a number of balls that the bearing has a great carrying capacity.

I claim:—

1. A ball bearing of the character described, including a ring U-shaped in section, a second ring having lateral lugs engaging the first referred to ring and inwardly bent lugs forming abutments for the first referred to ring, said first referred to ring being pressed against said inwardly bent lugs, and concentric members between which are received said ring members.

2. A ball bearing of the character described, including a ring U-shaped in section, a second ring having lateral lugs engaging the first referred to ring and inwardly bent lugs forming abutments for the first referred to ring, said first referred to ring being pressed against inwardly bent lugs by said lateral lugs, and concentric members between which are received said ring members having their opposed surfaces or circumferences recessed to receive and conform to the bearing balls.

3. In a ball-bearing, a cage comprising a ring of U-shaped section, and a second ring having lugs engaging a side of the former ring and inwardly-bent lugs abutting against the former ring, said former ring being pressed against said inwardly bent lugs by the lateral lugs, the bottom of the former ring being located in the central plane of the bearing, substantially as shown.

In witness whereof I have hereunto signed my name this twenty-seventh day of May 1910, in the presence of two subscribing witnesses.

HERMANN BARTHEL.

Witnesses:
 HENRY HASPER,
 WOLDEMAR HAUPT.